United States Patent [19]
Kuwabara

[11] Patent Number: 5,320,079
[45] Date of Patent: Jun. 14, 1994

[54] FUEL INJECTION CONTROL SYSTEM FOR AN INTERNAL COMBUSTION ENGINE AND METHOD THEREOF

[75] Inventor: Masaru Kuwabara, Musashino, Japan

[73] Assignee: Fuji Jukogyo Kabushiki Kaisha, Tokyo, Japan

[21] Appl. No.: 3,511

[22] Filed: Jan. 12, 1993

[30] Foreign Application Priority Data

Feb. 5, 1992 [JP] Japan .................. 4-20170

[51] Int. Cl.⁵ ............................. F02M 51/00
[52] U.S. Cl. .................................. 123/491
[58] Field of Search ............ 123/491, 436, 179.17, 123/419, 492, 493, 480; 364/431.1, 431.04, 431.05, 431.07, 431.08

[56] References Cited

U.S. PATENT DOCUMENTS

| 4,134,368 | 1/1979 | Hadley | 123/491 |
| 4,932,379 | 6/1990 | Tang et al. | 123/436 |
| 4,987,871 | 1/1991 | Nishikawa | 123/362 |
| 5,086,741 | 2/1992 | Nakamura et al. | 123/436 |
| 5,088,465 | 2/1992 | De Biasi et al. | 123/491 |
| 5,107,431 | 4/1992 | Ohta et al. | 364/431.1 |
| 5,213,081 | 5/1993 | Fujimoto | 123/419 |
| 5,219,397 | 6/1993 | Jones | 123/491 |
| 5,237,504 | 8/1993 | Holmes et al. | 364/431.08 |
| 5,239,473 | 8/1993 | Ribbens et al. | 364/431.08 |

Primary Examiner—Raymond A. Nelli
Attorney, Agent, or Firm—Beveridge, DeGrandi, Weilacher & Young

[57] ABSTRACT

A method is disclosed for controlling the fuel injection system for an internal combustion engine having a fuel injector for injecting fuel by a series of steps including: determining whether the engine performs stable combustion at the engine start depending on operating conditions of the engine; setting a fuel injection pulse width for the fuel injector in accordance with the operating conditions of the engine; and then generating a first pulse at an intake stroke of the engine and a second pulse at an exhaust stroke of said engine, when the engine does not perform stable combustion at the engine start, a total width of said first and second pulses corresponding to the set fuel injection pulse width.

27 Claims, 9 Drawing Sheets

FIG. 10a  WHEN TW ≧ T SET
FIG. 10b  WHEN TW < T SET

FIG.11

FUEL INJECTION CONTROL SYSTEM FOR AN INTERNAL COMBUSTION ENGINE AND METHOD THEREOF

BACKGROUND OF THE INVENTION

The present invention relates to a control method for a fuel injection system of an internal combustion engine where an optimum injection timing or fuel injection pulse width can be set in temperature ranges of the engine in a completely warmup state from an extremely low temperature state.

In general, in a fuel injection control of this type, all cylinders are injected at the same time at the time of starting an engine to cope with a quantity of required fuel and to reliably start an internal combustion engine. A fuel injection pulse width to be set in this case is determined on the basis of an engine temperature (mostly detected from a coolant temperature) without parameters of factors for determining an engine state such as an engine rotating speed, an intake air quantity, etc., since the factors of the engine rotating speed, the intake air quantity are unstable.

On the other hand, in a fuel injection control after a stable combustion immediately after starting the engine, the fuel injection is transferred to sequential injections. Since the engine is cooled, hence a fuel injection finishing time is set to a relatively delayed crank angle of an intake valve opening range so as to prevent adherence of fuel to the wall of the intake port and valve, and a fuel injection starting time responsive to the fuel injection pulse width set on the basis of an engine rotating speed, an intake air quantity, an engine temperature, etc., is determined in accordance with the fuel injection finishing time as a reference.

Since the engine is cooled in the start of the engine from a cryogenic temperature state, fuel atomization is difficult, and hence the quantity of required fuel is increased. When a fuel injection pulse width responsive to the quantity of required fuel is set for all cylinder simultaneous injection, an injection is started in a certain cylinder after the intake is finished, or fuel is continuously injected even after the intake stroke is finished, and the quantities of fuel to be supplied to the cylinders are different. As a result, the quantity of fuel adhered to the wall is the high at starting timing. Hence a misfiring easily occurs in the cylinder in which the quantity of actually supplied fuel is small, and thus the engine starting not only becomes unstable, but also fuel consumption is increased due to adherence of fuel to the wall.

On the other hand, since it is difficult in the sequential injections to accurately decide the fuel injection timing because of unstable engine rotating speed at the time of starting, starting properties of the engine are impaired.

The engine temperature rises as the time lapses while warming up the engine after a stable combustion is performed. Therefore, atomization of fuel by the heat in an intake port occurs by injecting fuel when an intake valve is closed even in the warmup range. However, in the conventional engine in which the fuel injection finishing time is fixed, exhaust emission and fuel consumption are relatively deteriorated as the engine temperature rises.

Japanese Patent Application Laid-Open 60-11652 discloses a technique for improving fuel consumption, the output and the exhaust emission by variably setting a fuel pressure of fuel supplying to injector in response to a quantity of intake air and supplying fuel for obtaining an optimum combustion condition in an intake stroke range. A variation in the quantity of required fuel at the time of starting strongly depends on an engine temperature as compared with the quantity of the intake air, and hence it is difficult with this technique to obtain preferable starting properties and warmup performance after a combustion is performed in the engine.

SUMMARY OF THE INVENTION

An object of the present invention is to provide a control method for a fuel injection system of an internal combustion engine where desired starting characteristics and warmup operation performance after stable combustion immediately after starting of the engine can be provided, fuel economy can be improved, and an exhaust emission can be improved.

In order to achieve the afore-described object according to a first aspect of the present invention, there is provided a control method for a fuel injection system of an internal combustion engine having, a plurality of cylinders with a piston reciprocating in a combustion chamber, a distributor for distributing an electric power to a spark plug, a rotor mounted on a distributor shaft of the distributor and provided with a plurality of protrusions, a cam angle sensor provided near the rotor for detecting the protrusion and for generating a cam signal, a temperature sensor inserted in a water jacket of the engine for sensing an engine temperature and for producing a temperature signal, a fuel injector for injecting a fuel into an intake pipe, and control means responsive to the cam and temperature signals for calculating a fuel injection pulse width to inject the fuel through the injector, an improvement in the method which comprises the steps of determining whether the engine is in a starting condition or not depending on operating conditions of the engine; setting a fuel injection pulse width in accordance with the operating conditions of the engine; and generating a half-width pulse of the fuel injection pulse width to the injector of the cylinder simultaneously at an intake and an exhaust stroke when the engine is in the starting condition.

In order to further achieve the afore-described object according to a second aspect of the present invention, there is provided a control method for a fuel injection system of an internal combustion engine having, a plurality of cylinders with a piston reciprocating in a combustion chamber, a distributor for distributing electric power to a spark plug, a rotor mounted on a distributor shaft of the distributor and provided with a plurality of protrusions, a cam angle sensor provided near the rotor for detecting the protrusion and for generating a cam signal, a temperature sensor inserted in a water jacket of the engine for sensing an engine temperature and for producing a temperature signal, a fuel injector for injecting fuel into an intake pipe, and control means responsive to the cam and temperature signals for calculating a fuel injection pulse width to inject the fuel through the injector, an improvement in the method which comprises the steps of determining whether combustion is performed in the combustion chamber or not depending on operating conditions of the engine; deciding a fuel injection finishing time within an opening period of an intake valve in accordance with an engine temperature in a delaying function while the engine temperature is low; setting a fuel injection pulse width to the injector in accordance with the operating conditions of the engine; and generating a fuel injection starting time in accordance with the fuel injection pulse width on the basis of the fuel injection finishing time when combustion is performed in the cylinder.

According to a control method for a fuel injection system of an internal combustion engine in accordance with a first aspect of the present invention, a half-width pulse of the fuel injection pulse width set in accordance with the operating conditions of the engine is generated to injectors of the cylinder simultaneously at an intake and an exhaust stroke when the engine is in the starting condition. Hence the fuel injection pulse widths of the respective injectors of the cylinder are shortened, an injection timing can be easily set, and starting ignition properties are improved.

According to a control method for a fuel injection system of an internal combustion engine in accordance with a second aspect of the present invention, a fuel injection finishing time after a stable combustion is performed is determined in a delaying function of the engine temperature while the engine temperature is low. Hence the injection time is delayed to reduce the quantity of adhered fuel to a wall of an intake port when the engine temperature is low, and the injection time is set earlier with the increase in engine temperature. Atomization of fuel is increased by heat in the intake port.

These and other objects and features of the present invention will be understood from the following description with reference to the accompanying drawings.

DETAILED DESCRIPTION OF THE PREFERRED EMBODIMENTS

The embodiments of the present invention will be explained with reference to accompanying drawings.

An embodiment of the present invention is shown in FIGS. 1 to 11.

Figure 6:
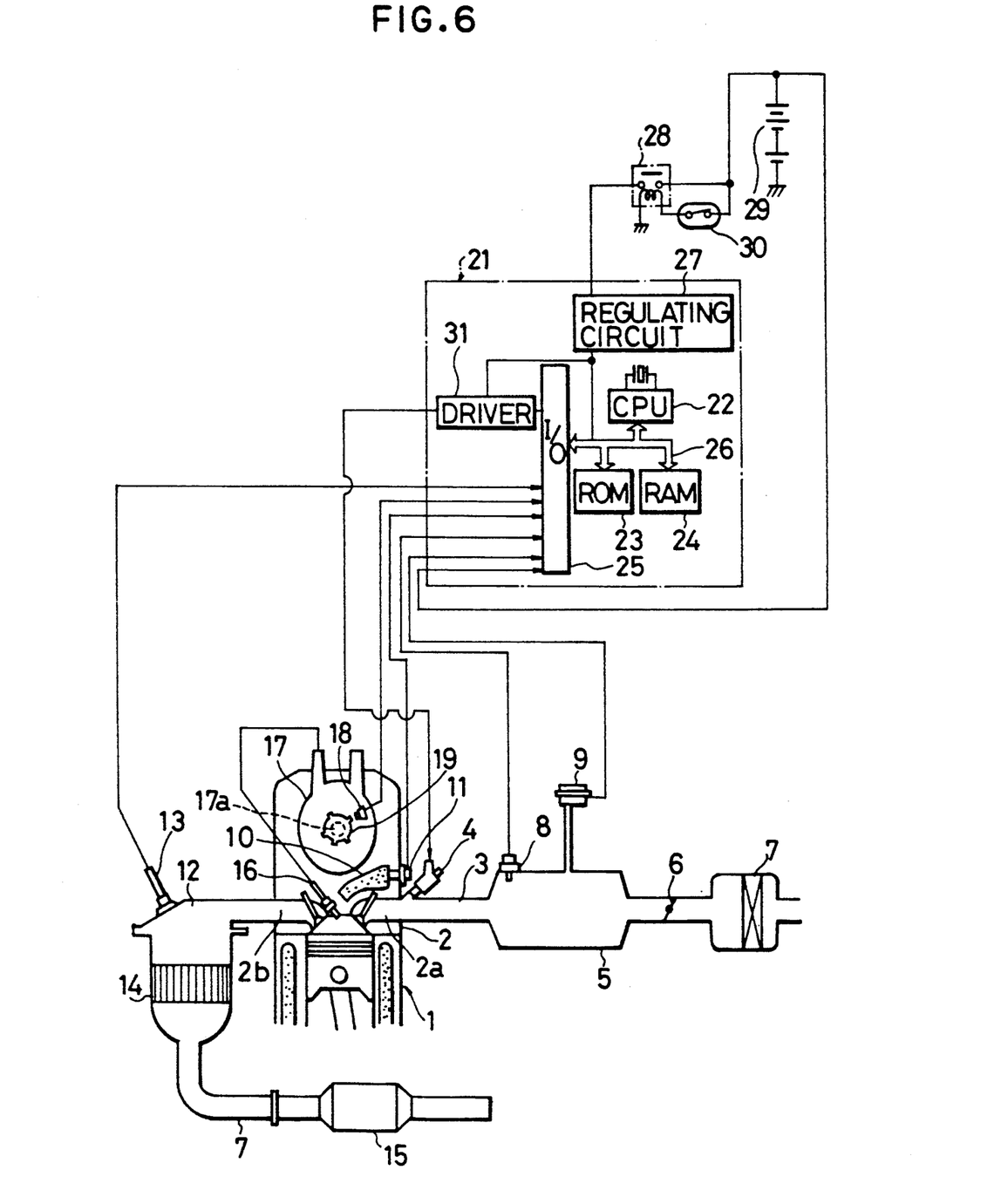
FIG. 6 is an entire schematic view of an engine control system according to the present invention.

In FIG. 6, showing an entire engine control system for executing the present invention, numeral 1 indicates an internal combustion engine (a straight 4-cylinder engine in FIG. 6). An intake manifold 3 is connected to an intake port 2a formed in a cylinder head 2 of the engine 1, and an injector 4 is mounted in the intake manifold 3.

Further, an air chamber 5 is connected to the intake manifold 3, and an air cleaner 7 is mounted on the upstream side of the air chamber 5 through a throttle valve 6. An intake temperature sensor 8 is disposed and an intake pipe pressure sensor 9 is mounted in the air chamber 5.

A coolant temperature sensor 11 is disposed in a coolant passage 10 formed in the cylinder head 2 of the engine 1, and an $O_2$ sensor 13 is disposed in exhaust manifolds 12 connected to exhaust ports 2b of the cylinder head 2. Numeral 14 shows a catalytic converter; and 15, a muffler.

Spark plugs 16 disposed in combustion chambers of the respective cylinders are energized from a distributor 17 through spark coils provided, for example, unified with ignitors (not shown) in accordance with a spark signal from the ignitors in response to an ignition timing calculated by an ECU 21 to be described later, and ignited.

The distributor 17 has a cam angle sensor 18 for both detecting a crank angle (a cam angle) and discriminating a cylinder, which is formed of an electromagnetic pickup or the like. A rotating rotor 19 is connected to a cam shaft of the engine 1 through a distributor shaft 17a, and the cam angle sensor 18 is disposed oppositely to an outer periphery of a rotating rotor 19. The cam angle sensor 18 is not limited to a magnetic sensor such as an electromagnetic pickup, but may be a photosensor.

Figure 7:
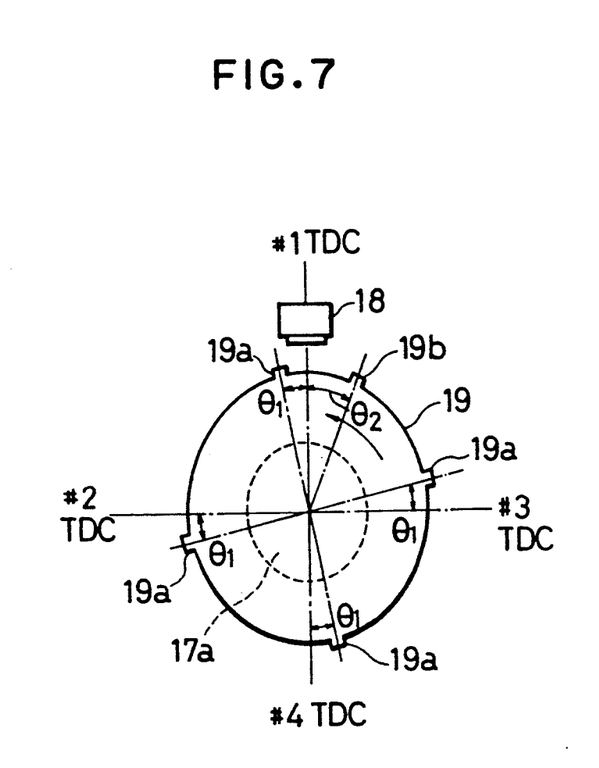
FIG. 7 is a front view of a rotor and a cam angle sensor of a fuel injection system of the first embodiment of the present invention.

As shown in FIG. 7, the rotor 19 is formed on the outer periphery with a reference crank angle detecting protrusion 19a at a position of a crank angle $\theta_1$ (e.g., 10° CA) before a top dead center (BTDC) during a compression of each cylinder (four cylinders in FIG. 7), and further formed with a cylinder discriminating protrusion 19b at a position of a crank angle $\theta_2$ (e.g., 20° CA) after the top dead center (ATDC) during the compression of the cylinder #1. In the case of a four-cylinder engine, the protrusions 19a are formed at each 90° (180° CA in terms of the crank angle), and a rotating speed NE of the engine is calculated from an interval time (period) for detecting the protrusions 19a. The protrusions 19a, 19b may be slits.

On the other hand, numeral 21 denotes a controller (ECU) formed of a microcomputer or the like. In the controller, a CPU 22, a ROM 23, a RAM 24 and an I/O interface 25 are connected to each other through a bus line 26, and a predetermined stabilized voltage is supplied from a constant-voltage circuit 27 to them.

The constant-voltage circuit 27 is connected to a battery 29 through the contact of an ECU relay 28, and a relay coil of the ECU relay 28 is connected to the battery 29 through an ignition switch 30.

The sensors 8, 9, 11, 13 and 18 are connected to input ports of the I/O interface 25, and connected with the battery 29 to monitor a battery voltage. On the other hand, the injectors 4 are connected to output ports of the I/O interface 25 through a driving circuit 31.

Fixed data such as a control program, and a fuel injection finishing period map or the like are stored in the ROM 23. Data obtained after output signals of the respective sensors are processed, and data calculated to be processed by the CPU 22 are stored in the RAM 24. The CPU 22 sets various control amounts such as a fuel injection amount at the time of starting or at a normal time after stable combustion on the basis of the various data stored in the RAM 24 in accordance with the control program stored in the ROM 23. And the CPU 22 outputs signals corresponding to the injector 4 for a fuel injection control. In addition, the CPU 22 sets various ignition timing in the same way as the fuel injection control mentioned above. Then the CPU 22 outputs ignition signal to ignitors (not shown) in order to perform an ignition timing control.

The control operation of the ECU 21 is described according to flowcharts of FIGS. 1 to 5.

Figure 2:
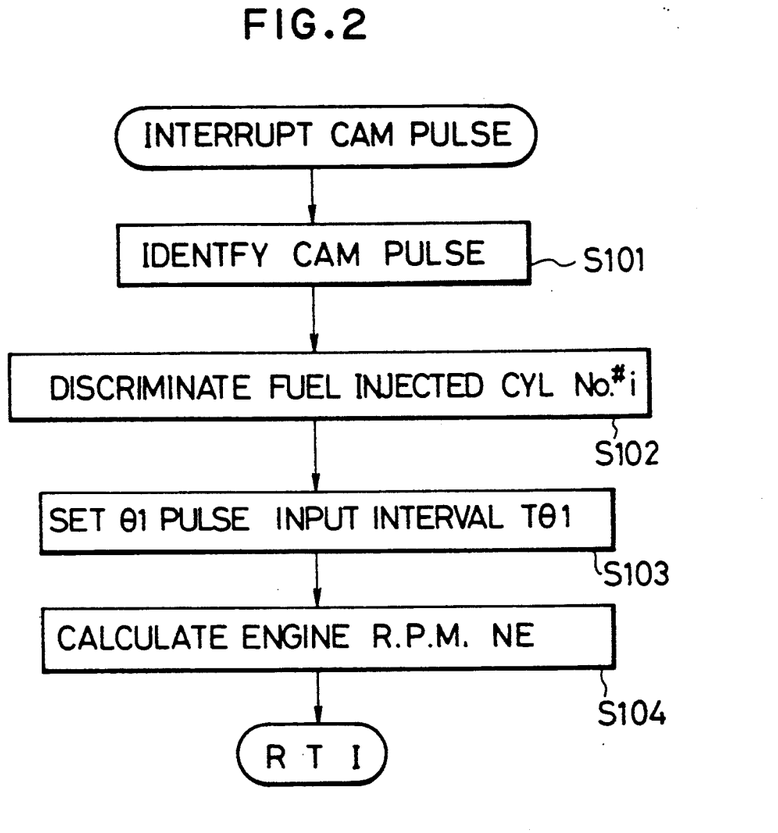
FIG. 2 is a flowchart showing cylinder discriminating and engine rotating speed calculating steps of the first embodiment of the present invention.
Figure 8A:
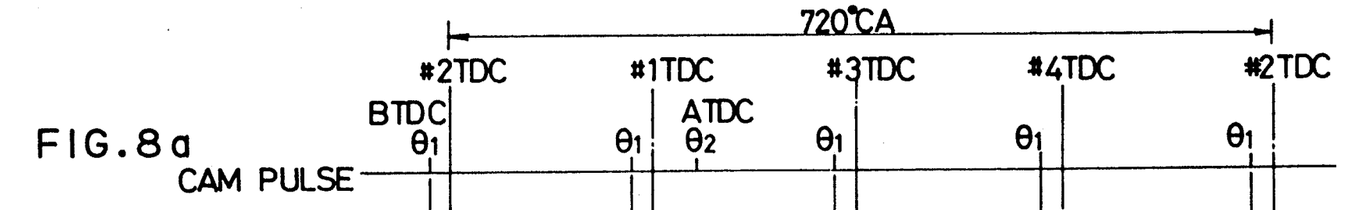
FIG. 8a is a time chart of fuel injection of the first embodiment of the present invention showing the cam pulse.

Cylinder discriminating and engine rotating speed calculating steps:

FIG. 2 shows a cylinder discriminating and engine rotating speed calculating routine which is executed by an interrupt of a cam pulse to be output from the cam angle sensor 18 when the cam angle sensor 18 detects the protrusions 19a, 19b of the rotor 19. First, in a step (hereinafter abbreviated as "S") 101, a cam pulse detected by the cam angle sensor 18 is identified. That is to say, as shown in FIG. 8(a), when the reference crank angle detecting protrusion 19a (BTDC $\theta$1) of the rotor 19 is detected, time intervals of $\theta$1 pulses to be input from the cam angle sensor 18 to the ECU 21 are substantially equal. A time interval from when the $\theta$1 pulse is input to when the $\theta$2 pulse is input, is shorter than a time interval at the inputs of the respective $\theta$1 pulses. When the cylinder discriminating protrusion 19b (ATDC $\theta$2) of the rotor 19 is detected, and a time interval from when the $\theta$2 pulse is input to when next $\theta$1 pulse is input, is shorter than a time interval at the inputs of the respective $\theta$1 pulses. Hence the ECU 21 identifies the $\theta$1 pulse from the $\theta$2 pulse from the relative relationship of the input time intervals of the cam pulses. When the order of combustion cylinders is #1, #3, #4 and #2, the ECU 21 identifies that next cam pulse is the signal for detecting the BTDC $\theta$1 of the cylinder #3 by detecting the $\theta$2 pulse immediately after the $\theta$1 pulse is detected, and further identifies that next cam pulse is the signal for detecting the BTDC $\theta$1 of the cylinder #4.

The fuel injection corresponding to cylinder #i (i=1, 3, 4, 2) is discriminated on the basis of the cam pulse identified in the S101, in an S102.

More specifically, in the four-cycle four-cylinder engine of this embodiment, the order of combustion cylinders is #1, #3, #4 and #2. When the $\theta$1 pulse for detecting the BTDC $\theta$1 of the cylinder #1 is, for example, input, a cylinder to be ignited next is the cylinder #3, and a cylinder #i to be fuel injected is the cylinder #2.

Then, in an S103, clocking an input interval time (period) T$\theta$1 of the $\theta$1 pulse on the basis of the $\theta$1 pulse which is output from the cam angle sensor 18, and in an S104, an engine rotating speed NE is calculated on the basis of the input interval time T$\theta$1, and stored in a predetermined address of the RAM 24 as rotating speed data, and a transaction of a routine is executed.

Figure 1:
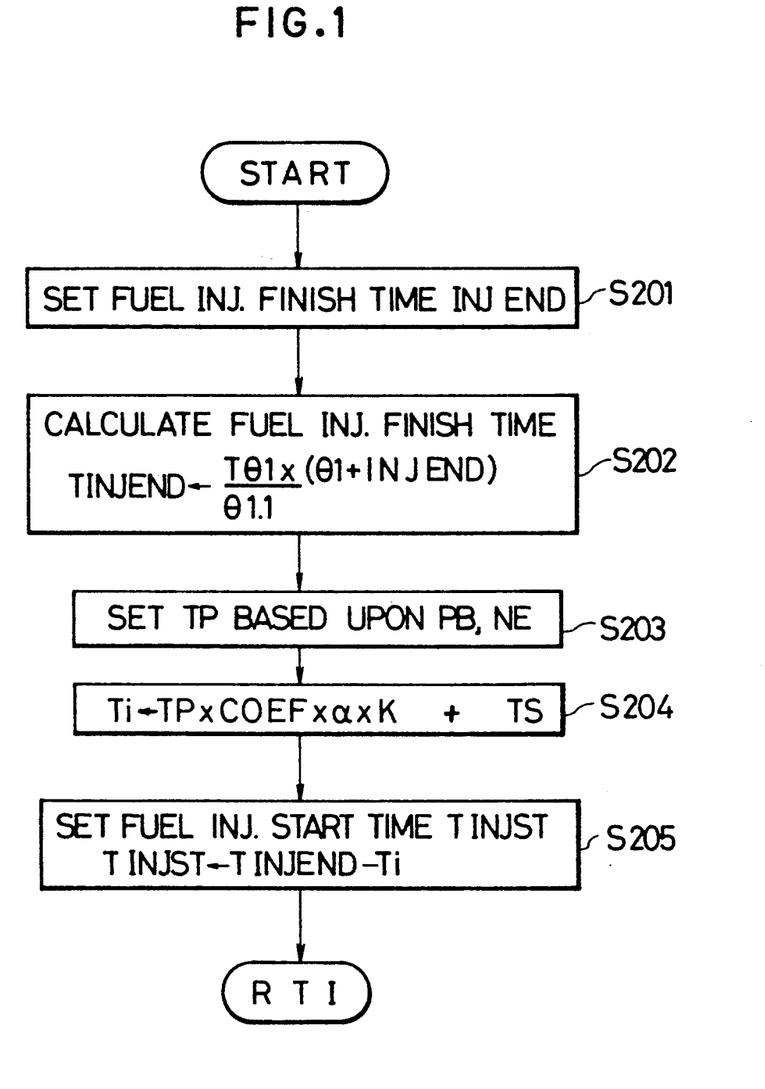
FIG. 1 is a flowchart showing setting sequence of fuel injection pulse width and injection timing of the first embodiment of the present invention.
Figure 9A:
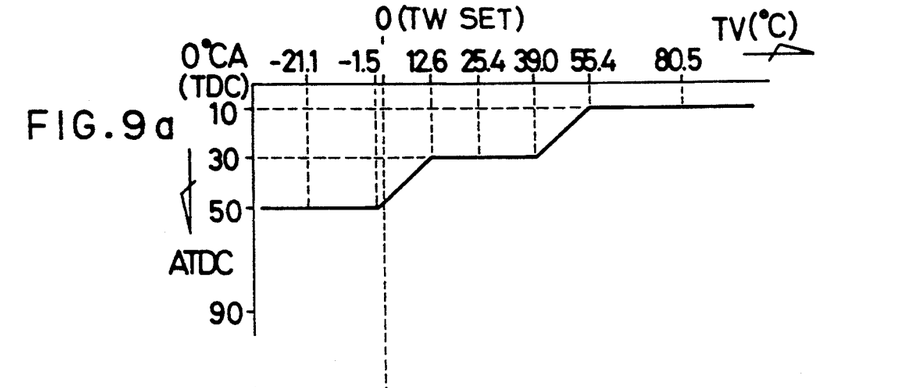
FIG. 9a is a time chart of a fuel injection finishing time map and combustion rotating speed with cooling temperature as a parameter according to the present invention.

Fuel injection pulse width and injection timing setting steps:

The fuel injection pulse width and the injection timing are set in an interrupt routine of FIG. 1 to be executed at each predetermined time. First, in S201, a fuel injection finishing period (angle) INJEND is set by an interpolating calculation with reference to a fuel injection finishing period map stored in the ROM 23 on the basis of a coolant temperature TW detected by the coolant temperature sensor 11. As shown in FIG. 9(a), the fuel injection finishing time map is a two-dimensional map previously obtained from experiments on the basis of the coolant temperature TW, and the lower the coolant temperature TW is, the later the fuel injection finishing time INJEND is set. In FIG. 9(a), the fuel injection finishing time (angle) INJEND is divided to three stages of 50, 30 and 10° CA in response to the coolant temperatures TW.

In S202, the fuel injection finishing timing TINJEND is calculated. This fuel injection finishing timing INJEND converts the time data with the fuel injection finishing time INJEND as angle data into time data with $\theta$1 pulse input as a reference to be obtained by the following formula:

$$TINJEND \leftarrow (T\theta1/\theta1.1) \times (\theta1 + INJEND)$$

where
T$\theta$1: $\theta$1 pulse input interval time
$\theta$1.1: $\theta$1 pulse input interval angle (180° CA in this embodiment)
$\theta$1: reference crank angle (BTDC10° CA in this embodiment)

A basic fuel injection pulse width TP is set on the basis of the intake pipe pressure PB detected by the intake pressure sensor 9 and the engine rotating speed NE read from a predetermined address of the RAM 24 by calculating or retrieving map in S203.

Thereafter, in S204, the basic fuel injection pulse width T$P$ is corrected by various increasing amount correction coefficient COEF in accordance with a mixture ratio correction, a high load correction, and an air conditioner increasing correction, air-fuel ratio feedback correction coefficient $\alpha$, a learning correction coefficient KBLRC for compensating aging deteriorations of the various sensors, and a voltage correction coefficient T$_S$, and a fuel injection pulse width Ti is set from the following formula.

$$Ti \leftarrow TP \times (COEF \times \alpha \times KBLRC) + T_S$$

Then, in S205, a fuel injection starting time in accordance with the $\theta$1 pulse on the basis of the fuel injection pulse width Ti and the fuel injection finishing timing TINJEND, i.e., the fuel injection starting timing TINJST is set from the following formula, and the transaction of the routine is executed.

$$TINJST \leftarrow TINJEND - Ti$$

Figure 3:
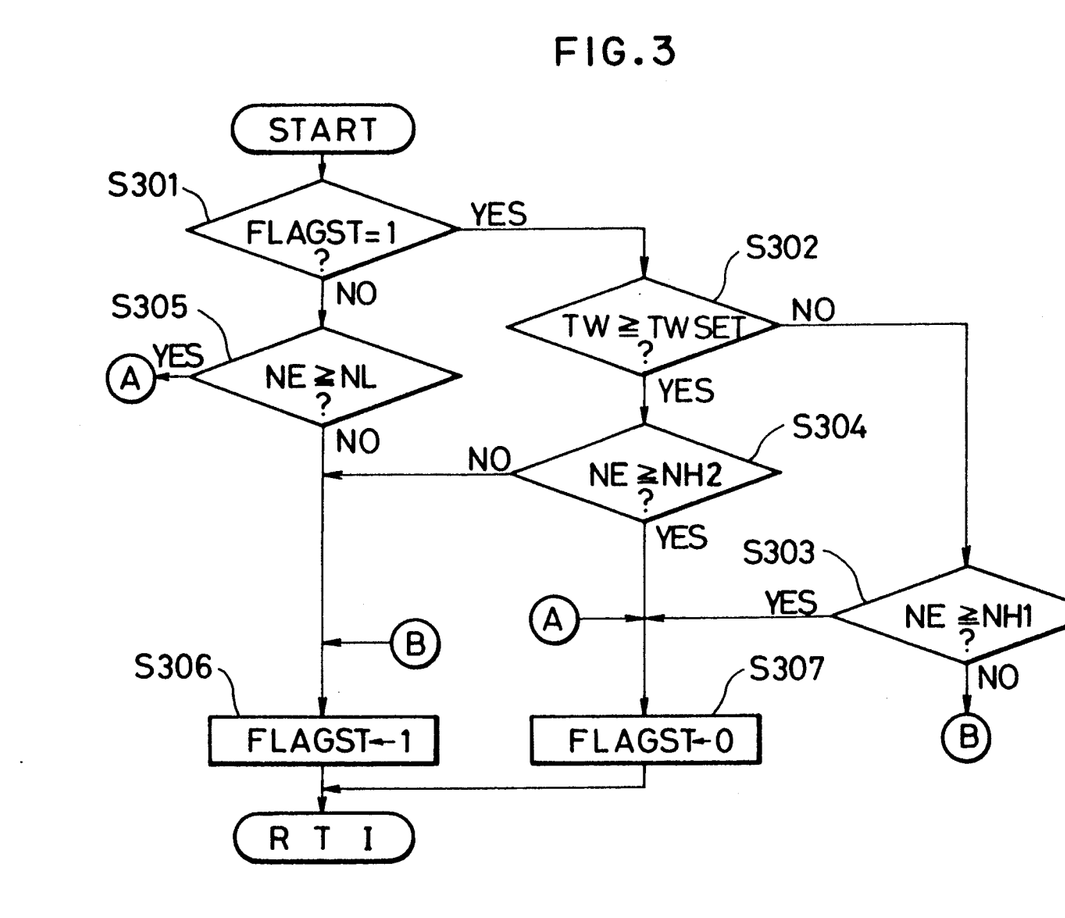
FIG. 3 is a flowchart showing discriminating step of starting time control and normal time control of the first embodiment of the present invention.

Starting time control and normal time control discriminating step:

Starting time control execution or normal time control execution is selected in accordance with an interrupt routine of FIG. 3 to be executed at each predetermined time. First, in S301, by referring to the value of a starting time normal time control discriminating flag FLAGST selected at the time of the previous routine execution. If FLAGST=1 when the starting time control is selected at the time of the previous routine execution, the routine is advanced to S302, and the coolant temperature TW is compared with a preset low temperature discriminating value TWSET (e.g., 0° C.). In case of TW<TWSET, a low temperature start is judged, and the routine is advanced to S303. In case of TW≧TWSET, a normal temperature start is judged, and the routine is advanced to S304.

When the low temperature start is judged and the routine is advanced to the S303, the engine rotating speed NE is compared with a preset low temperature time stable combustion discriminating rotating speed NH1 (e.g., 800 rpm). In case of NE<NH1, the unstable combustion is judged, and the routine is advanced to S306 to select the starting time control. In case of NE≧NH1, the transfer to the stable combustion state is judged, and the routine is advanced to S307 to select the normal time control.

When the normal temperature start is judged in the S302 and the routine is advanced to the S304, the engine rotating speed NE is compared with a preset normal temperature stable combustion discriminating rotating speed NH2 (e.g., 500 rpm). In case of NE<NH2, unstable combustion is judged, and the routine is advanced to S306 to select the starting time control. In case of NE≧NH2, the transfer to the stable combustion state is judged, and the routine is advanced to the S307 to select the normal time control.

On the other hand, in the S301, FLAGST=0, and when the normal time control is selected at the time of the previous routine execution, the routine is advanced to S305, the engine rotating speed NE is compared with a preset engine stop discriminating rotating speed NL (e.g., 300 rpm). In case of NE≧NL, the normal time control is to be continuously selected, and the routine is advanced to the S307. In case of NE<NL, transfer to an engine stop is judged, and the routine is advanced to the S306 to select the starting time control.

When the starting state is judged in the S303 and S304 or the engine stop state is judged in the S305 and the routine is advanced to the S306, the starting time normal time control discriminating flag FLAGST is set (FLAGST to 1), the starting time control is selected, and the transaction of the routine is executed. When the stable combustion state is judged in the S303, S304, or S305 and the routine is advanced to the S307, the starting time normal time control discriminating flag FLAGST is cleared (FLAGST to 0), the normal time control is selected, and the transaction of the routine is executed.

The initial value of the starting time normal time control discriminating flag FLAGST is "1".

Figure 9B:
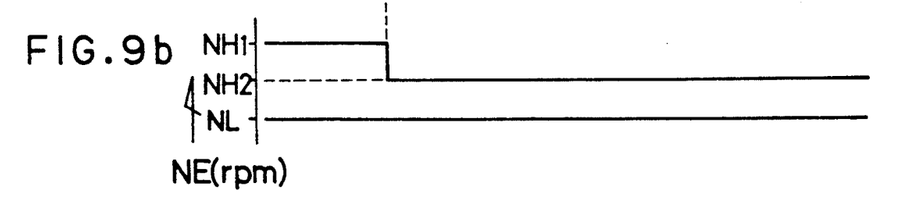
FIG. 9b is a time chart of fuel injection finishing time map and combustion rotating speed according to the present invention.
Figure 10A:
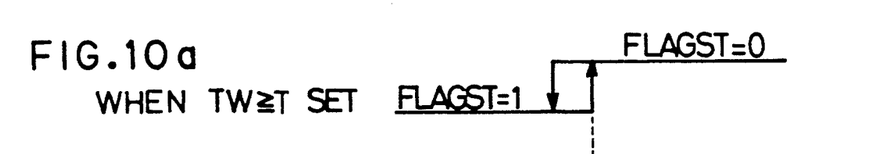
FIG. 10a is a switching explanatory view of a starting time when TW is equal to or greater than T and a normal time control to be set on the basis of cooling temperature according to the present invention and FIG. 10b is switching explanatory view of a starting time when TW is less than T according to the present invention.
Figure 10B:
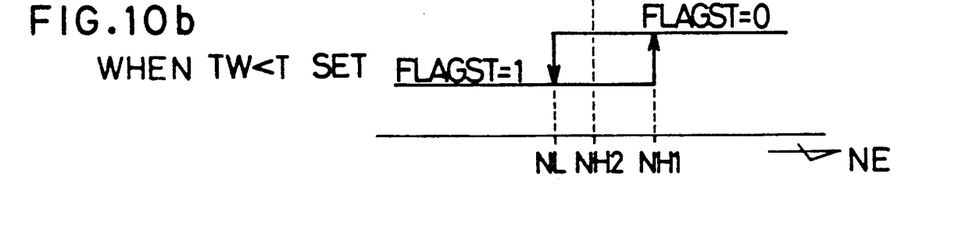

As shown in FIG. 9(b), the discriminating rotating speeds NL, NH2, NH1 have the relationship of NL<NH2<NH1. In FIG. 9(b), the discriminating rotating speeds NH2, NH1 are so set as to be switched in case of TWSET=0° C. As understood from the above flowchart, the starting time normal time control discriminating flag FLAGST has a hysteresis in which the flag FLAGST is different in dependency on the coolant temperature TW (see FIG. 10).

This is caused because influence of friction is not substantially considered at the normal temperature time (TW≧TWSET) but only a hysteresis for preventing hunting of the control may be considered whereas the influence of the friction is considered at the low temperature time (TW<TWSET). It is necessary to set the combustion discriminating rotating speed NE1 at the time of the low temperature to a value higher than the stable combustion discriminating rotating speed NH2 at the normal temperature time.

Figure 4:
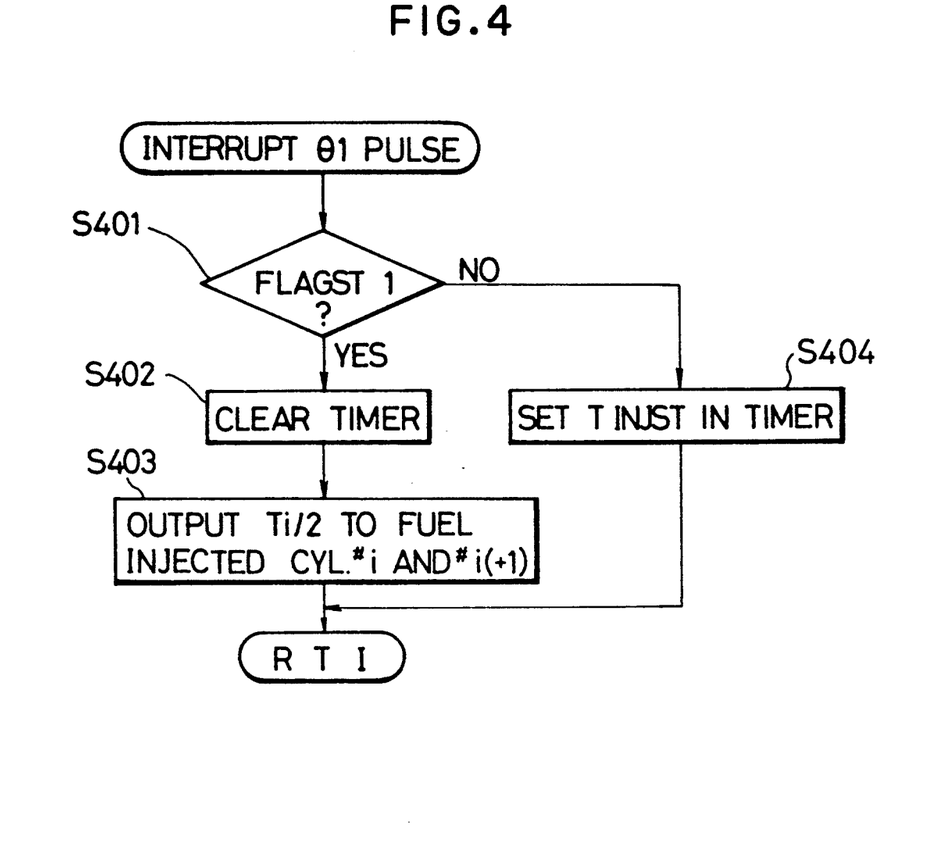
FIG. 4 is a flowchart showing fuel injection control step of the first embodiment of the present invention.

Fuel injection control step:

After the transaction of the afore-described fuel injection pulse width setting routine, the injection timing setting routine, the starting time control discriminating routine, and normal time control discriminating routine, a routine of the fuel injection control step shown in FIG. 4 is executed. First, in S401, by referring to a value of the starting time normal time control discriminating flag FLAGST, and FLAGST=1. When the starting time control is selected, the routine is advanced to an S402, and a timer is cleared. Then, in S403, pulse widths (Ti/2) of halves of the fuel injection pulse widths Ti set by the fuel injection pulse width and injection timing setting routine to injectors 4 of cylinder #i to be fuel injected, discriminated by the cylinder discriminating and engine rotating speed calculating routine and cylinder #i(+1) to be next fuel injected, are output, and the transaction of the routine is executed.

Figure 8B:
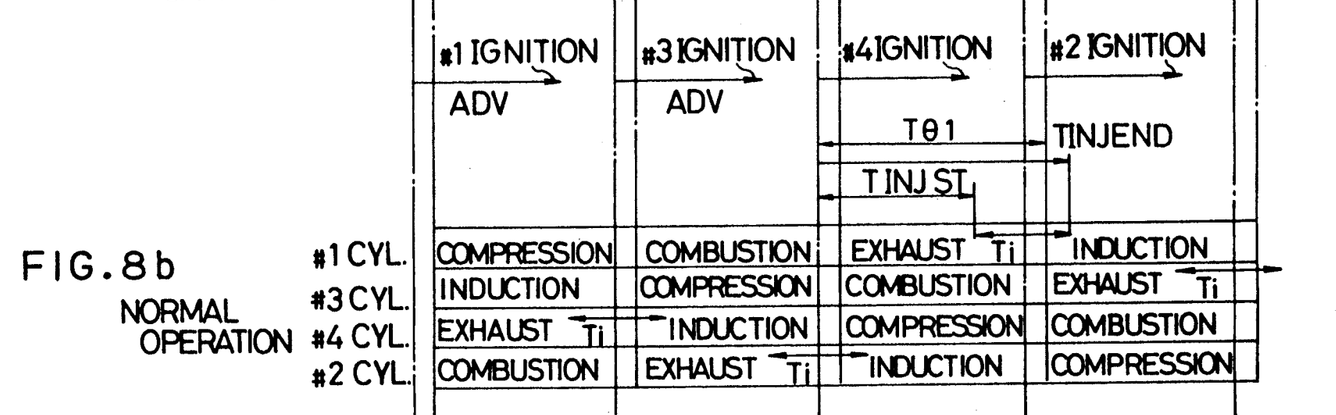
FIG. 8b is a time chart of the fuel injection showing normal operation according to the present invention.
Figure 8C:
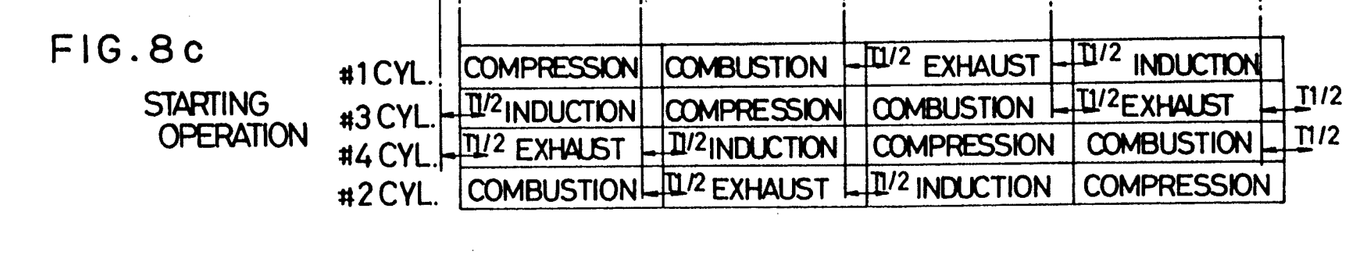
FIG. 8c is a time chart of fuel injection showing starting operation according to the present invention.

As shown in FIG. 8(c), when the cylinder #i to be fuel injected is the intake stroke cylinder #3 in case where the order of the combustion cylinders is #1, #3, #4 and #2, next cylinder #i to be fuel injected is the exhaust stroke cylinder #4. At the time of the starting time control, sequential split into two, intake and exhaust, injections are executed.

On the other hand, in the S401, FLAGST=0. When the normal time control is selected, the routine is advanced to S404, the fuel injection starting timing TINJST is timer-set, and the transaction of the routine is executed.

Figure 5:
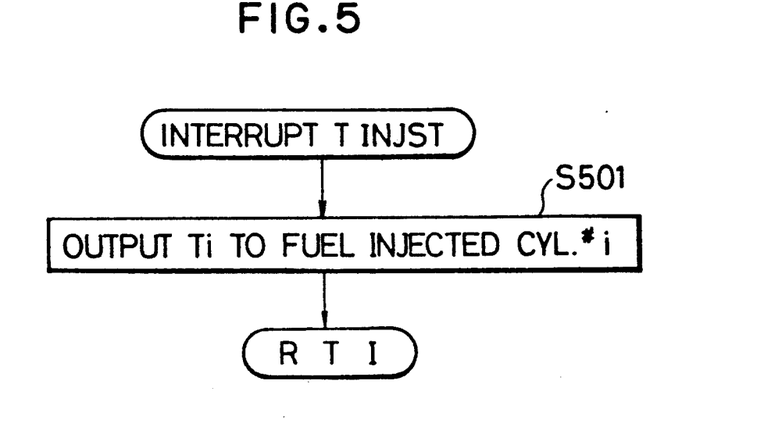
FIG. 5 is a flowchart showing fuel injection outputting step of the first embodiment of the present invention.

Fuel injection outputting step:

When counting by the timer reaches the fuel injection starting timing TINJST, an interrupt routine of FIG. 5 is started. In S501, the fuel injection pulse width Ti set by the afore-described fuel injection pulse width and injection timing setting routine to the injectors 4 of the cylinder #i to be fuel injected, discriminated by the cylinder discriminating and engine rotating speed calculating routine, is output.

FIG. 8(b) shows a time chart of the normal time control, and FIG. 8(c) shows a time chart of fuel injection of the starting time control.

In the normal time control, the fuel injection finishing time, i.e., the fuel injection finishing timing TINJEND is set later on the basis of the coolant temperature TW as the coolant temperature TW is lower, and the fuel injection starting timing TINJST is set on the basis of the fuel injection pulse width Ti with the fuel injection finishing timing TINJEND as a reference. Hence injection is finished while an intake valve is slightly opened at the time of cold state such as warmup. Therefore, adherence of fuel to wall in the intake port and valve is reduced, the warmup time can be not only shortened, but also fuel economy is improved. As the coolant temperature TW, i.e., the engine temperature rises, the fuel injection timing is set at an earlier time, and atomization of fuel by the heat in the intake port is quickened.

On the other hand, in the starting time control, sequential split into two, intake and exhaust split injections are executed. Hence even in the low rotating speed of large variation in the rotating speed, and a desired quantity of fuel can be accurately supplied to the combustion chamber. Hence, in the time control system to be executed by converting the control timing, the injection timing can be set more accurately.

Reference symbol ADV in FIG. 8(a) denotes an ignition time.

Figure 11:
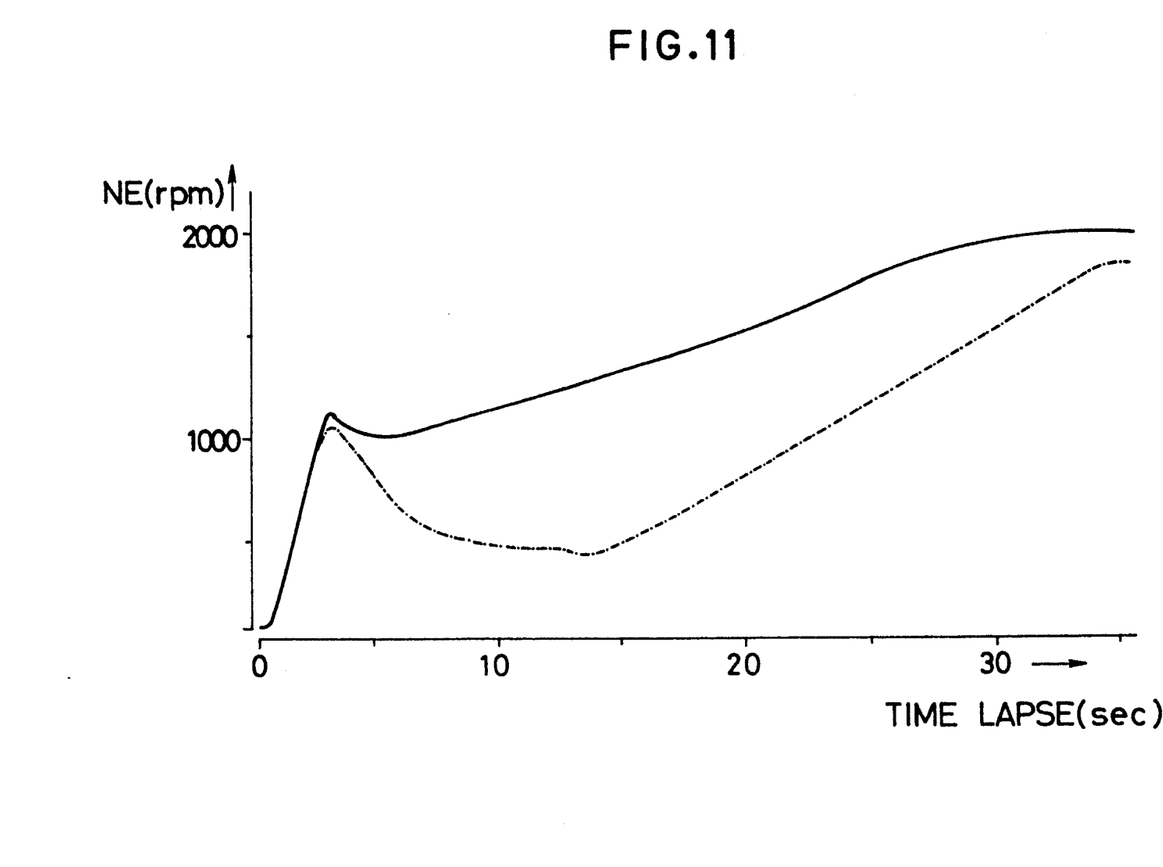
FIG. 11 is a timechart of an engine rotating speed when the starting time control is shifted to the normal time control.

As a result, as indicated by a solid line in FIG. 11, the engine rotating speed NE can be smoothly raised from the start of the engine to the warmup as compared with prior art indicated by one-dotted broken line, an ignition mistake is reduced, not only preferable starting performance but also excellent heat state restarting characteristics is obtained.

According to the present invention as aforedescribed, the following effects may be obtained.

Half pulse widths of the fuel injection pulse width set on the basis of the engine state are output simultaneously to the injectors of the intake and exhaust stroke cylinders at the time of starting, and hence the fuel injection pulse widths of the injectors are shortened, the injection timing is easily set, and consequently starting ignition is improved.

The fuel injection finishing timing to be set after the stable combustion immediately after starting is delayed later as the engine temperature is lower. Hence, when the engine temperature is low, the injection timing is delayed to inject fuel, and hence adherence of fuel to the wall in the intake port is reduced, the warmup time can be not only shortened, but also fuel economy is improved. Since the injection timing can be set at an earlier time as the engine temperature rises and atomization of fuel by the heat in the intake port can be quickened, exhaust emission can be reduced, and fuel consumption can be improved.

While the presently preferred embodiments of the present invention has been shown and described, it is to be understood that these disclosures are for the purpose of illustration and that various changes and modifications may be made without departing from the scope of the invention as set forth in the appended claims.

For example, the present invention may also be applied for an angle control type fuel injection control.

What is claimed is:

1. A method for controlling a fuel injection system for an internal combustion engine, said fuel injection system having a fuel injector for injecting a fuel into said engine, comprising:
    determining whether said engine performs stable combustion at the engine start depending on operating conditions of said engine;
    setting a fuel injection pulse width for said fuel injector in accordance with said operating conditions of said engine; and
    generating a first pulse at an intake stroke of said engine and a second pulse at an exhaust stroke of said engine, when said engine does not perform stable combustion at the engine start, the total width of said first and second pulses corresponding to said set fuel injection pulse width.

2. A method for controlling a fuel injection system for an internal combustion engine having a fuel injector for injecting a fuel into said engine, comprising:
    determining whether said engine performs stable combustion at the engine start depending on operating conditions of said engine;
    deciding a fuel injection finishing time within an opening period of an intake valve depending on a temperature of said engine;
    setting a fuel injection pulse width in accordance with said operating conditions of said engine; and
    generating a pulse having said fuel injection pulse so as to finish said pulse at said fuel injection finishing time when said engine performs stable combustion at the engine start.

3. A fuel injection control system for an internal combustion engine, having a fuel injector for injecting a fuel into said engine, the system comprising:
    determining means for determining whether said engine performs stable combustion at the engine start depending on operating conditions of said engine;
    setting means for setting a fuel injection pulse width in accordance with said operating conditions of said engine; and
    generating means for generating a first pulse at an intake stroke of said engine and a second pulse at an exhaust stroke of said engine, when said determining means determines that said engine does not perform stable combustion at the engine start, the total width of said first and second pulses corresponding to said fuel injection pulse width set by said setting means.

4. A fuel injection control system for an internal combustion engine, having a temperature sensing means for sensing an engine temperature and for producing a temperature signal and a fuel injector for injecting a fuel into said engine, the system comprising:
    determining means for determining whether said engine performs stable combustion at the engine start depending on operating conditions of said engine;
    deciding means for deciding a fuel injection finishing timing within an opening period of an intake valve in response to said temperature signal;
    setting means for setting a fuel injection pulse width for said injector in accordance with said operating conditions of said engine; and
    generating means for generating a pulse having said fuel injection pulse width so as to finish said pulse at said fuel injection finishing time when said determining means determines that said engine performs stable combustion at the engine start.

5. The method according to claim 1, wherein the width of each of said first pulse and said second pulse is half of said fuel injection pulse width.

6. The method according to claim 1 further comprising:
    generating a pulse with said fuel injection pulse width so as to finish said pulse at said fuel injection finishing time when said engine performs stable combustion at the engine start.

7. The method according to claim 6, wherein said determining step comprises:
    comparing an engine speed with a predetermined value, thereby determining that said engine does not perform stable combustion when said engine speed is lower than said predetermined value and that said engine performs stable combustion when said engine speed is higher than said predetermined value.

8. The method according to claim 6, wherein said determining step comprises:
comparing a temperature of said engine with a preset value; and
comparing an engine speed with a first predetermined value when said temperature is lower than said preset value and with a second predetermined value when said temperature is higher than said preset value, thereby determining that said engine does not perform stable combustion when said engine speed is lower than either one of said first and second predetermined values and that said engine performs stable combustion when said engine speed is higher than either one of said first and second predetermined values.

9. The method according to claim 8, wherein said determining step further comprises:
comparing said engine speed with a third predetermined value after it is once determined that said engine performs stable combustion, said third predetermined value being smaller than said second predetermined value, thereby determining that said engine is back to unstable combustion when said engine speed becomes lower than said third predetermined value.

10. The method according to claim 2, wherein said generating step comprises:
calculating a fuel injection start time based on said fuel injection finishing time and said set fuel injection pulse width.

11. The method according to claim 2, further comprising:
generating a first pulse at an intake stroke of said engine and a second pulse at an exhaust stroke of said engine, when it is determined that said engine does not perform stable combustion at the engine start, the total width of said first and second pulses corresponding to said set fuel injection pulse width.

12. The method according to claim 11, wherein said determining step comprises:
comparing an engine speed with a predetermined value, thereby determining that said engine performs stable combustion when said engine speed is higher than said predetermined value and that said engine does not perform stable combustion when said engine speed is lower than said predetermined value.

13. The method according to claim 11, wherein said determining step comprises:
comparing a temperature of said engine with a preset value; and
comparing an engine speed with a first predetermined value when said temperature is lower than said preset value and with a second predetermined value when said temperature is higher than said preset value, said second predetermined value being smaller than said first predetermined value, thereby determining that said engine performs stable combustion when said engine speed is higher than either one of said first and second predetermining values and that said engine does not perform stable combustion when said engine speed is lower than either one of said first and second predetermined values.

14. The method according to claim 13, wherein said determining step further comprises:
comparing said engine speed with a third predetermined value after it is once determined that said engine performs stable combustion, said third predetermined value being smaller than said second predetermined value, thereby determining that said engine is back to unstable combustion when said engine speed becomes lower than said third predetermined value.

15. The system according to claim 3, wherein said generating means is adapted to set a width of each of said first pulse and said second pulse as half of said fuel injection pulse width.

16. The system according to claim 3 wherein said generating means is adapted to generate a pulse having said fuel injection pulse width so as to finish said pulse at said fuel injection finishing timing when said engine performs stable combustion at the engine start.

17. The system according to claim 16, further comprising:
engine speed sensing means for sensing an engine speed and producing an engine speed signal;
said determining means including comparing means responsive to said engine speed signal for comparing said engine speed with a predetermined value and for determining that said engine does not perform stable combustion when said engine speed is lower than said predetermined value and that said engine performs stable combustion when said engine speed is higher than said predetermined value.

18. The system according to claim 16, further comprising:
engine temperature sensing means for sensing an engine temperature and for producing a temperature signal; and
engine speed sensing means for sensing an engine speed and for producing an engine speed signal;
said determining means including first comparing means responsive to said temperature signal for comparing said engine temperature with a preset value and second comparing means responsive to said engine speed signal for comparing said engine speed with a first predetermined value when said engine temperature is lower than said preset value and with a second predetermined value when said engine temperature is higher than said preset value, and for determining that said engine does not perform stable combustion when said engine speed is lower than either one of said first and second predetermining values and that said engine performs stable combustion when said engine speed is higher than either one of said first and second predetermined values.

19. The system according to claim 18, wherein said determining means further comprises third comparing means for comparing said engine speed with a third predetermined value after it is once determined that said engine performs stable combustion, said third predetermined value being smaller than said second predetermined value, and for determining that said engine is back to unstable combustion when said engine speed becomes lower than said third predetermined value.

20. The system according to claim 4, wherein said deciding means includes a map indicating the variation of said fuel injection finishing time depending on the magnitude of said engine temperature, in which the lower said engine temperature is, the later said fuel injection finishing time is set.

21. The system according to claim 4, wherein said generating means comprises calculating means for calculating a fuel injection start timebased on said fuel injection finishing time and said set fuel injection pulse width.

22. The system according to claim 4, wherein said generating means is adapted to generate a first pulse at an intake stroke of said engine and a second pulse at an exhaust stroke of said engine, when said engine does not perform stable combustion at the engine start, a total width of said first and second pulses corresponding to said set fuel injection pulse width.

23. The system according to claim 22, further comprising:
engine speed sensing means for sensing an engine speed and for producing engine speed signal;
said determining means including comparing means responsive to said engine speed signal for comparing said engine speed with a predetermined value and for determining that said engine performs stable combustion when said engine speed is higher than said predetermined value and that said engine does not perform stable combustion when said engine speed is lower than said predetermined value.

24. The system according to claim 22, further comprising;
engine speed sensing means for sensing an engine speed and for producing an engine speed signal;
said determining means including first comparing means responsive to said temperature signal for comparing said engine temperature with a preset value and second comparing means responsive to said engine speed signal for comparing said engine speed with a first predetermined value when said engine temperature is lower than said preset value and with a second predetermined value when said engine temperature is higher than said preset value, said second predetermined value being smaller than said first predetermined value, and for determining that said engine performs stable combustion when said engine speed is higher than either one of said first and second predetermined values and that said engine does not perform stable combustion when said engine speed is lower than either one of said first and second predetermined values.

25. The system according to claim 24, wherein said determining means further includes third comparing means for comparing said engine speed with a third predetermined value after it is once determined that said engine performs stable combustion, said third predetermined value being smaller than said second predetermined value, and for determining that said engine is back to unstable combustion when said engine speed becomes lower than said third predetermined value.

26. A method for controlling a fuel injection system for an internal combustion engine, having a fuel injector for injecting a fuel into said engine in response to a fuel injection pulse, the method comprising:
determining whether said engine performs stable combustion at the engine start depending on operating conditions of said engine;
calculating a width of the fuel injection pulse based on said operating conditions of said engine; and
generating to said injector, in response to a combustion state at the engine start determined by the determining step, either a pulse with said calculated fuel injection width or a first pulse and second pulse at an intake stroke and exhaust stroke of said engine, respectively, the total width of said first pulse and second pulse corresponding to said calculated fuel injection pulse width.

27. A fuel injection control system for an internal combustion engine, having a fuel injector for injecting fuel into said engine in response to a fuel injection pulse, the system comprising:
determining means for determining whether said engine performs stable combustion at the engine start depending on operating conditions of said engine;
calculating means for calculating a width of the fuel injection pulse based on said operating conditions of said engine; and
generating means responsive to a combustion state at the engine start determined by said determining means, for generating to said injector either a pulse with said calculated fuel injection width or a first pulse and second pulse at an intake stroke and exhaust stroke of said engine, respectively, the total width of said first pulse and second pulse corresponding to said calculated fuel injection pulse width.

* * * * *